US009532548B2

(12) United States Patent
Bryson

(10) Patent No.: US 9,532,548 B2
(45) Date of Patent: Jan. 3, 2017

(54) ANIMAL TRAVEL SYSTEM

(71) Applicant: Jack Bryson, Grayslake, IL (US)

(72) Inventor: Jack Bryson, Grayslake, IL (US)

( * ) Notice: Subject to any disclaimer, the term of this patent is extended or adjusted under 35 U.S.C. 154(b) by 0 days.

(21) Appl. No.: 14/248,793

(22) Filed: Apr. 9, 2014

(65) Prior Publication Data

US 2014/0216355 A1    Aug. 7, 2014

Related U.S. Application Data

(63) Continuation of application No. 12/422,019, filed on Apr. 10, 2009, now Pat. No. 8,714,111.

(60) Provisional application No. 61/044,325, filed on Apr. 11, 2008.

(51) Int. Cl.
*A01K 1/00* (2006.01)
*A01K 1/02* (2006.01)

(52) U.S. Cl.
CPC ........... *A01K 1/0245* (2013.01); *A01K 1/0254* (2013.01)

(58) Field of Classification Search
CPC ........................... A01K 1/0272; A01K 1/0281
USPC ................. 119/496, 497, 482, 453, 499
See application file for complete search history.

(56) References Cited

U.S. PATENT DOCUMENTS

| | | | |
|---|---|---|---|
| 6,913,271 B2 * | 7/2005 | Gordon | 280/87.01 |
| 7,261,060 B1 * | 8/2007 | Garofola et al. | 119/496 |
| 7,617,797 B2 * | 11/2009 | Lam | 119/497 |
| 2004/0016409 A1 * | 1/2004 | Schwinghammer et al. | 119/453 |
| 2008/0245311 A1 * | 10/2008 | Kline | 119/496 |
| 2009/0205578 A1 * | 8/2009 | Alves | 119/454 |

* cited by examiner

*Primary Examiner* — Kristen C Hayes
(74) *Attorney, Agent, or Firm* — McAndrews, Held & Malloy, Ltd.

(57) ABSTRACT

An animal carrier for installation into an automotive seat is described. The animal carrier has a frame that is formed by the attachment of the bottom edge of a substantially vertical back panel to the back facing edge of a substantially horizontal floor panel, and the further attachment of a spine to both the top edge of the vertical back panel and the forward facing edge of the floor panel. The enclosure of the animal carrier can be formed by the attachment of two side panels, and optionally a front panel, to the frame. The animal carrier can be mounted onto an automotive seat by the passage of an installation belt though a belt path or channel formed through either the back or floor panel.

6 Claims, 10 Drawing Sheets

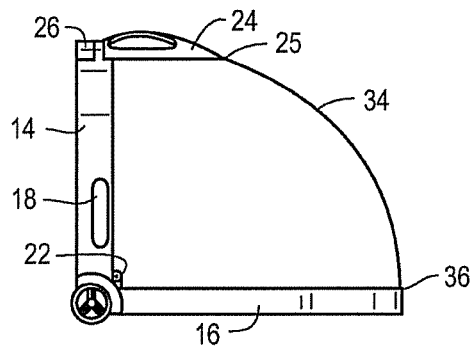
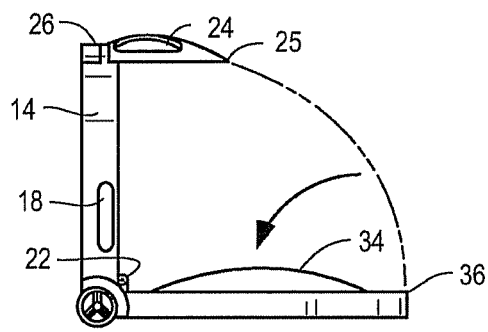
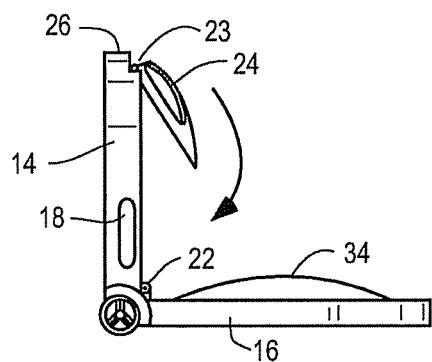
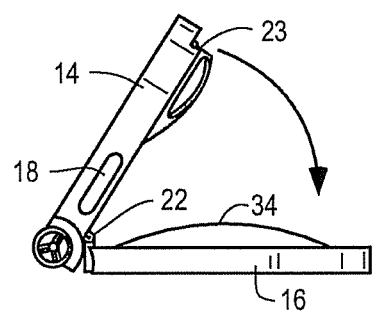
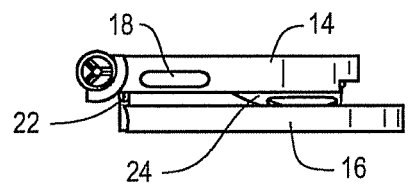

ANIMAL TRAVEL SYSTEM

This application is a continuation of application Ser. No. 12/422,019, filed Apr. 10, 2009, which is related to and claims priority from U.S. Provisional Patent Application Ser. No. 61/044,325, filed Apr. 11, 2008, the contents of which are incorporated herein by reference in their entirety.

FEDERALLY SPONSORED RESEARCH OR DEVELOPMENT

[Not Applicable]

MICROFICHE/COPYRIGHT REFERENCE

[Not Applicable]

TECHNICAL FIELD

The invention relates to an animal travel system, and in particular to an animal carrier that is attachable to an automotive seat.

BACKGROUND OF THE INVENTION

Animals can be unpredictable, and should be safely restrained while being transported. Unrestrained animals are the cause of many accidents, as they can distract or interfere with the driver's ability to control or operate the vehicle. Moreover, unrestrained animals can become large projectiles in an accident, exerting hundreds or even thousands of pounds of impact force, injuring not only themselves but others in the vehicle. Unrestrained animals can even be ejected.

Moreover, restraining an animal will also help stabilize the animal when a vehicle is braking, cornering, or accelerating. This in turn will also help to calm an animal that is fearful in a moving vehicle, or one that suffers from carsickness. An unrestrained animal, such as a dog, in an accident is likely in shock, confused, or injured. In this condition, the animal is likely to be protective, and unrestrained may attack rescuers.

Unrestrained animals are also problematic when the windows of a vehicle are opened. An animal, such as a dog, should not be allowed to put its head outside the vehicle because the animal can be injured by particles of debris or become ill from having cold air forced into its lungs. The animal that is allowed to have its head outside of a vehicle can be subjected to, for example, inner ear damage, lung infections and possible eye damage. Moreover, unrestrained animals can jump out of cars. Even in a slow moving vehicle, an animal that jumps out of an open window can suffer serious injury or even death.

BRIEF SUMMARY OF THE INVENTION

An aspect of the present invention is an animal carrier that is attachable to an automotive seat and that is designed for improved safety.

Another aspect of the invention is an animal carrier that is portable and easily stowed.

BRIEF DESCRIPTION OF SEVERAL VIEWS OF THE DRAWINGS

FIGS. 6a through 6e are diagrammatic side elevation views of the embodiment of FIG. 3, showing a foldable or collapsible frame (assembled for use) for an animal carrier.

DETAILED DESCRIPTION OF THE INVENTION

As used herein the term animal can be any animal, domestic or otherwise. For example, the term animal can refer to a dog, cat, rodent, squirrel, guinea pig, ferret, marsupial, rabbit, bird, or any other animal in need of restraint or transport.

Figure 1:
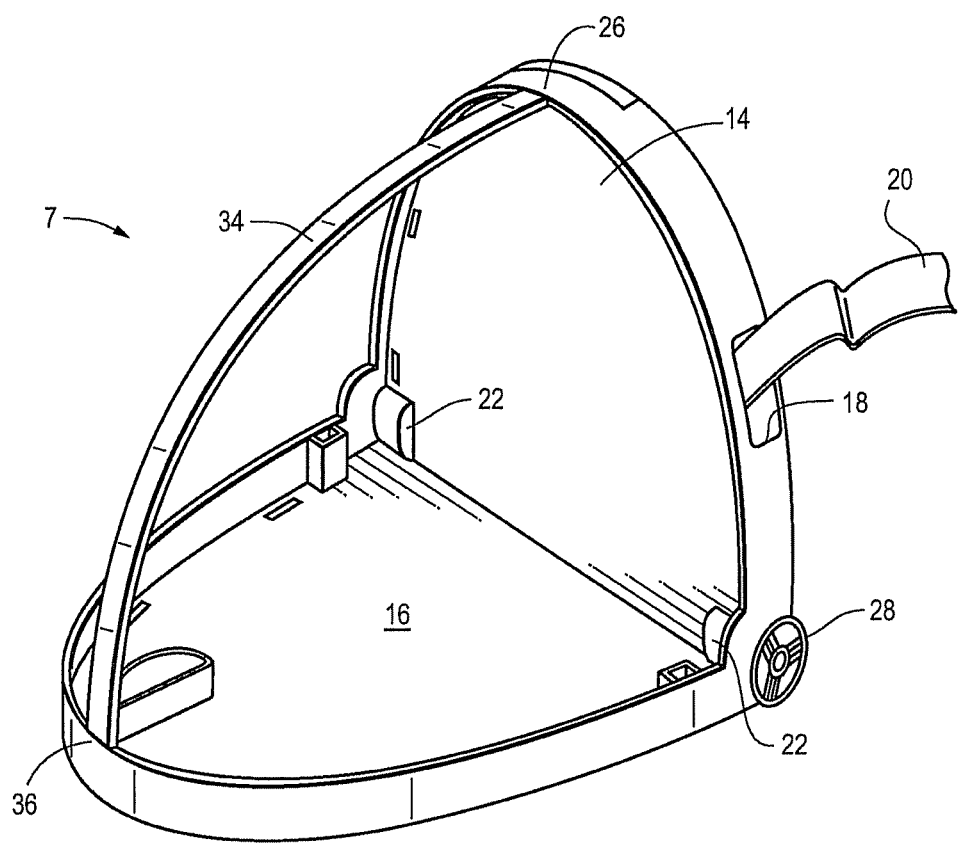
FIG. 1 is a side perspective view of one embodiment

FIG. 1 shows one embodiment that is a frame 7 for an animal carrier. The frame 7 has a back panel 14 attached to a floor panel 16. The back panel 14 can be attached to the floor panel 16 at one or more hinge points 22. The frame 7 and any animal carrier formed using frame 7 can be reversibly attached to an automotive seat by passage of a belt 20 through a belt path 18 formed within and through the back panel 14. As used herein, a belt path is a path or channel which is open ended and through which a belt can be threaded or passed. The frame 7 also has at least one spine 34 that is attached to the back panel 14, such as to the apex 26 of the back panel 14. The spine 34 is also attached to the floor panel 16, such as to the forward edge 36 of the floor panel 16. The back panel 14 and the floor panel 16 can be fixed relative to each other, with the back panel 14 substantially vertical and the floor panel 16 substantially horizontal. The back panel 14 and the floor panel 16 can also move relative to each other about at least one hinge point 22, with the back panel 14 substantially vertical and the floor panel 16 substantially horizontal when in use.

The frame 7 can also have one or more wheels 28 attached at any position which will provide rolling transport, including for example attachment to the back panel 14, or to the floor panel 16, or any combination thereof. For example, two wheels 28 can be attached to the bottom of the back panel 14. Optionally, two wheels can be attached to the bottom of the back panel 14, and one or more wheels can be attached to the forward edge 36 of the floor panel 16.

The support spine 34 can be any shape and dimension. For example, the support spine 34 can be from between 2 to 8 cm wide, and from between 2 to 8 cm thick, and long enough to make contact with both the apex 26 of the back panel 14 and the forward edge 36 of the floor panel 16. The spine 34 can be any length and curvature, and preferably has a smooth curve. The spine 34 can be made of steel, fiberglass, or other materials, preferably materials having substantial resilience. The support spine 34 can also be made to fold about one or more hinge points, for example to facilitate storage.

Figure 2:
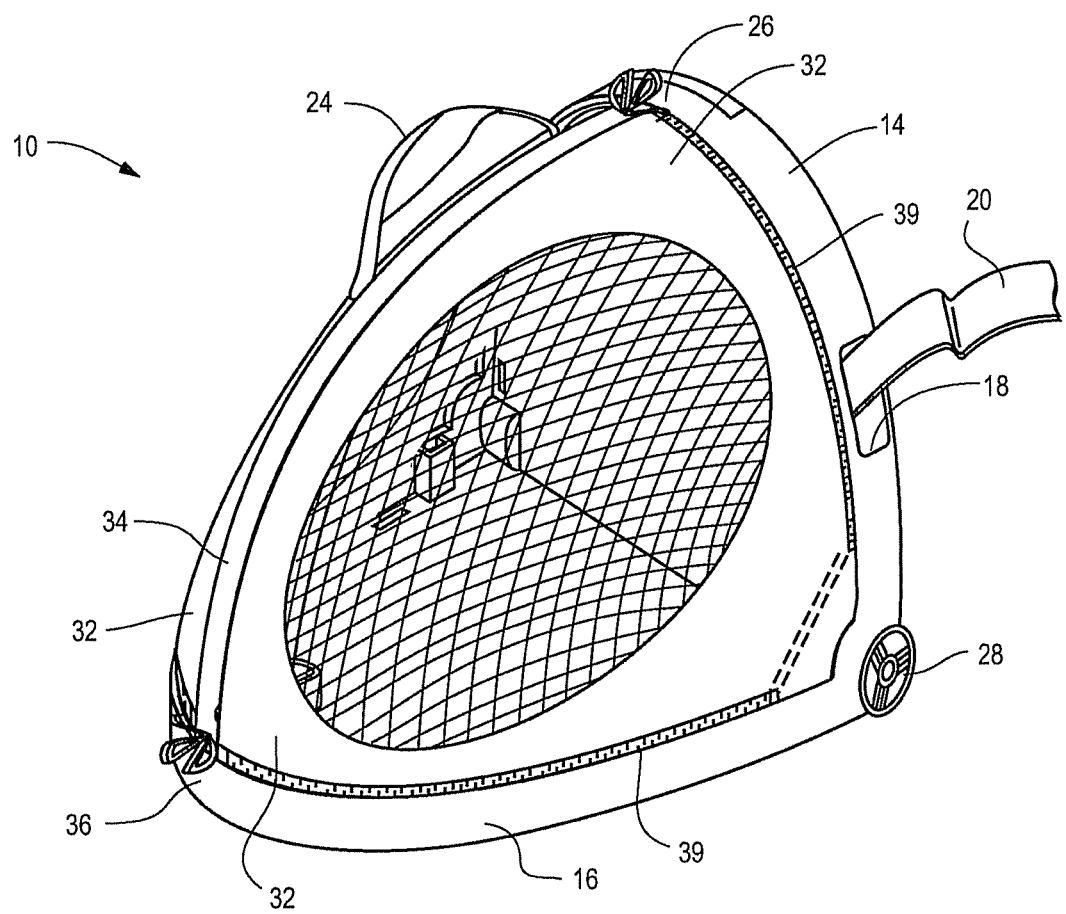
FIG. 2 is a side perspective view of the embodiment of FIG. 1 showing an enclosure formed by the attachment of two side panels.

FIG. 2 shows one embodiment of an animal carrier 10, made using the frame 7 of FIG. 1. The enclosure of the animal carrier 10 is formed by attachment of two side panels 32 to the frame 7 shown in FIG. 1. The two side panels 32 can be mirror images of each other or different, for example in their manner of attachment to the frame 7 or in some other characteristic. For example, the two side panels can have different openings or view windows, or can be made from different materials. The two side panels 32 are preferably curved, flexible, and/or shaped for attachment to the contour edge of the spine 34, the back panel 14, and the floor panel 16. The two side panels 32 are attached to the contour edge of the back panel 14 shown in FIG. 1, to the contour edge of the floor panel 16 shown in FIG. 1, and along the length the spine 34. The side panels 32 can be made from any combination or variety of material. Generally, any of the panels described herein for attachment to any frame described herein can be made from rigid material such as molded plastics, or a flexible material such as fabrics, or some combination or derivative thereof. Any of the panels can optionally have one or more windows or vents made from a perforated and/or transparent material (such as perforated plastics), or a meshed, webbed, or netted fabric.

FIG. 2 also shows a carry handle 24 attached along the length of the spine 34. In general, a carry handle 24 can be attached at any position on the animal carrier 10 that will facilitate hand held transport, including for example to the spine 34.

Figure 3:
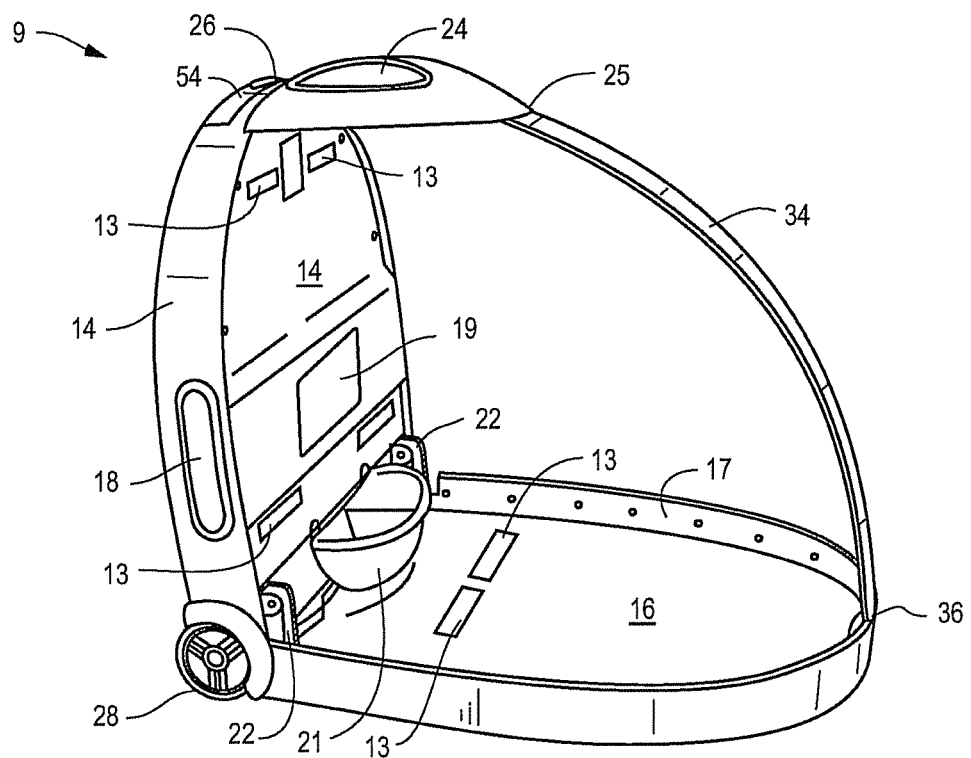
FIG. 3 is a perspective view of another embodiment

FIG. 3 shows one embodiment that is a frame 9 for an animal carrier. The frame 9 also has a back panel 14 attached to a floor panel 16. The frame 9 and any animal carrier formed using frame 9 can be reversibly attached to an automotive seat by passage of a belt through a belt path 18 in the back panel 14. The frame 9 has a carry handle 24 attached to the apex 26 of the back panel 14. The carry handle 24 can be made to move about at least one hinge point relative to the back panel 14. The frame 9 has a spine 34 that is attached to the carry handle 24, as for example to the forward edge 25 of the carry handle 24. The attachment of the spine 34 to the handle 24 or to the forward edge 25 can be made to be reversible and can also be made to pivot about at least one hinge point. The spine 34 is also attached to the floor panel 16, as for example to the forward edge 36 of the floor panel 16. The animal carrier can also have one or more wheels 28. The wheels can be attached at any position on the animal carrier which will result in rolling transport, including for example attachment to the back panel 14, or to the floor panel 16, or any combination thereof. For example, two wheels 28 can be attached to the bottom of the back panel 14. Optionally, two wheels can be attached to the bottom of the back panel 14, and one or more wheels can be attached to the forward edge 36 of the floor panel 16. Also shown in FIG. 3 is a cross-member gripping surface 54 of a telescoping handle assembly that is collapsed into the back panel 14 and hidden from view (see telescoping handle 50 assembly of FIG. 7.)

As shown in FIG. 3, the back panel 14 can also have an opening 19 to allow access to the interior of the belt path 18. The back panel 14 can also have a detachable dish or bowl 21. The bowl 21 can be attached for example by a slot or pressure fit, or by hook and loop (e.g., Velco). The back panel 14 and the floor panel 16 can be fixed relative to each other, or the back panel 14 and the floor panel 16 can move relative to each about at least one hinge. For example, the back panel 14 can be pivotally attached to the floor panel 16 by hinges 22, so that the back panel 14 and the floor panel 16 can move or swing relative to one another. For example, the back panel 14 and the floor panel 16 can be made to move toward each other (e.g.,—apex 26 moving toward forward edge 36) when folding for storage, and away from each other to a fixed position during use (e.g.,—90 degree angle as shown in FIG. 3, or where the back 14 is substantially vertical and the floor panel is substantially horizontal). The movement of the back panel 14 relative to the floor panel 16 about one or more hinge points can also be reversed and/or otherwise modified to facilitate assembly or storage. The back panel 14 and the floor panel 16 can also have one or more hook and loop strips 13 (e.g., Velcro strips), or other means for the reversible attachment of a liner (such as a foam padding or other energy absorbent material).

The back panel 14 and/or the floor panel 16 can have a raised edge 17 for the reversible or irreversible attachment of panels forming the enclosure of the animal carrier, such as side or front panels made from either a rigid material or a fabric. Attachment of a side panel or front panel to the edge 17 can be by bolting, riveting, sewing, zippering or any other means known in the art.

Figure 4:
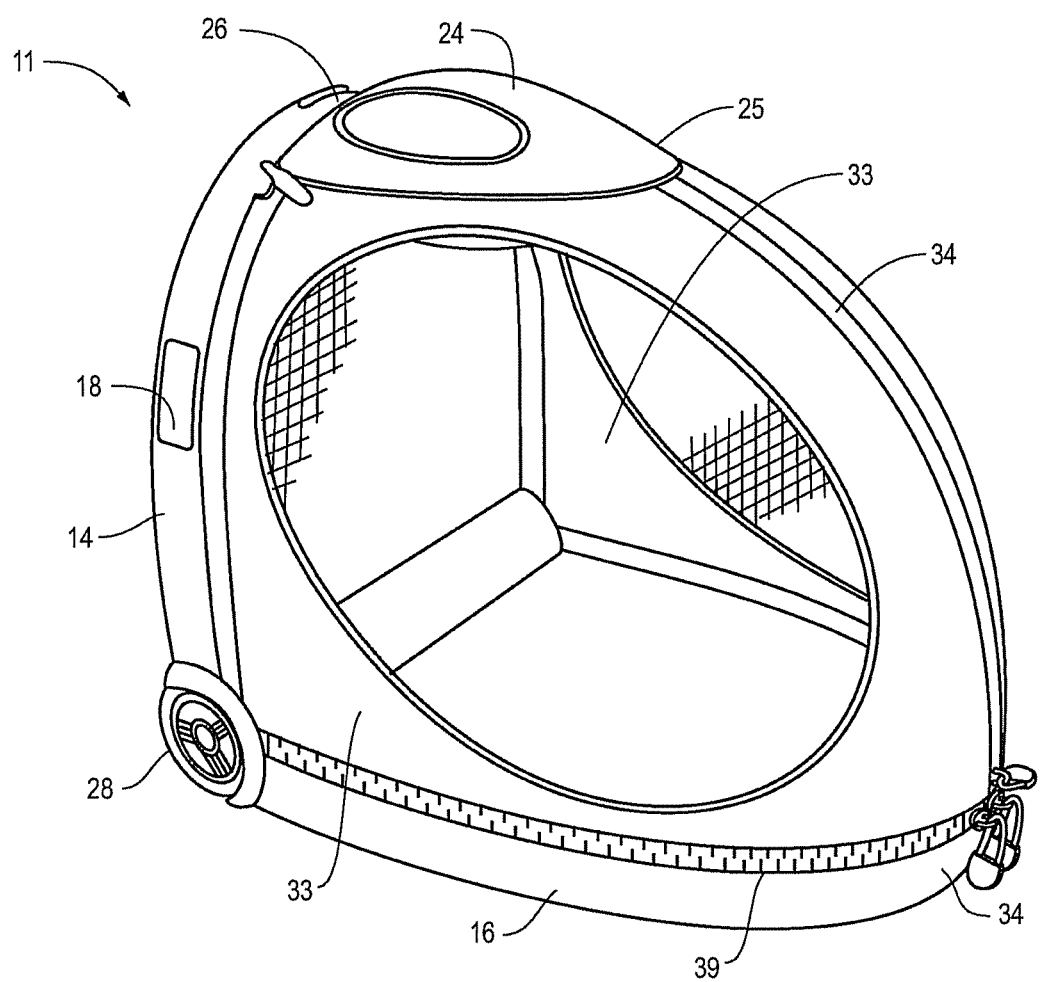
FIG. 4 is a perspective view of the embodiment of FIG. 3 showing an enclosure formed by the attachment of two side panels.

FIG. 4 shows one embodiment of an animal carrier 11, made using the frame 9 of FIG. 3. The enclosure of the animal carrier 11 is formed by the attachment of two side panels 33 to the frame 9 of FIG. 3. The two side panels can be mirror images of each other or different, for example in the manner of attachment to frame 9 or in some other characteristic, such as in the presence or absence of a window or the material from which the panel is made. The two side panels 33 are curved, flexible, and/or shaped for attachment to the contour edges of the frame 9, such as for example to the spine 34, the carry handle 24, the back panel 14, and/or the floor panel 16. The two side panels 33 are attached to the contour edge of the back panel 14, to the contour edge of the floor panel 16, and along the length the spine 34 shown in FIG. 3. The side panels 33 can be made from any combination or variety of material, and can include transparent materials to form windows, such as for example mesh fabric, or other transparent or perforated plastics or fabrics, or combinations thereof.

Figure 5:
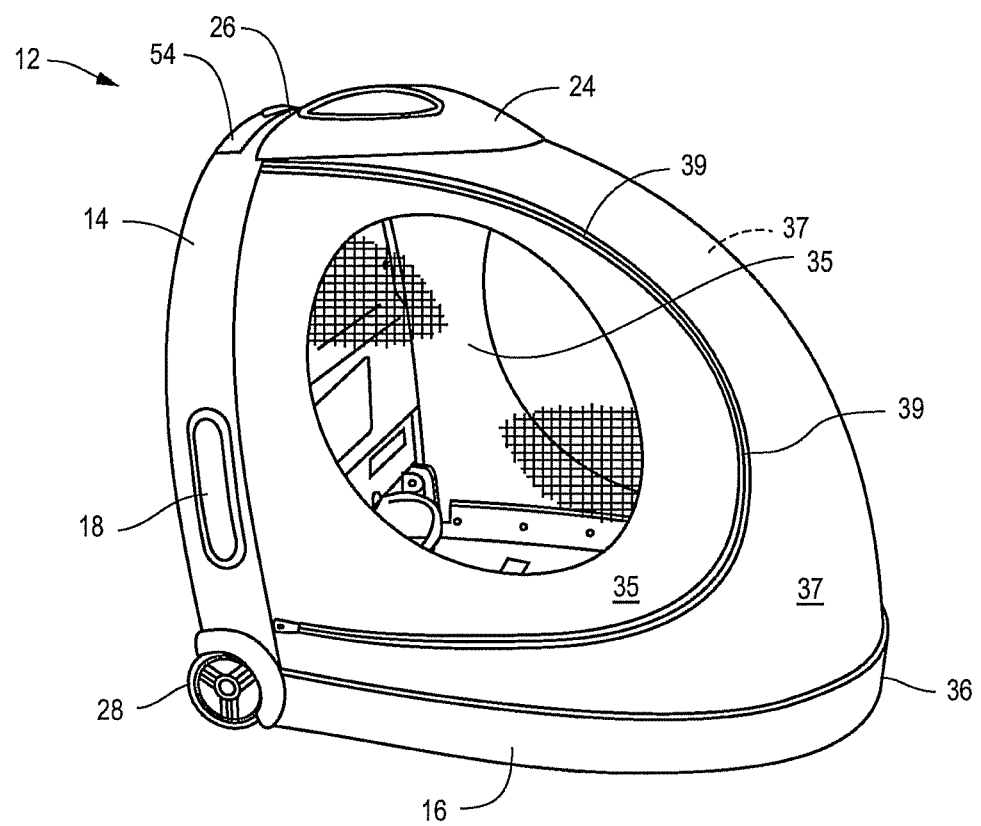
FIG. 5 is a perspective view of the embodiment of FIG. 3 showing an enclosure formed by the attachment of two side panels and a front panel.

FIG. 5 shows another embodiment of an animal carrier 12, made using the frame 9 of FIG. 3, wherein the spine 34 is hidden from view by a front panel 37. In certain embodiments the front panel 37 is made from fabric and has a path through which the spine 34 is passed. The spine 34 can then be attached to the carry handle 24 and the floor panel 16 in the same manner as shown in FIG. 3. In other embodiments, the spine can be integrated or stitched or otherwise irreversibly attached to the front panel 34. In either embodiment the spine 34 adds structural support to a front panel that is made from a flexible material such as fabric.

As shown in FIG. 5, the enclosure of the animal carrier 12 can be formed by the attachment of three separate panels to the frame 9 shown in FIG. 3, including two side panels 35 and a front panel 37. The two side panels 35 can be mirror images of each other or different, for example in the manner of attachment to frame 9 or in some other characteristic. The two side panels 35 are curved, flexible, and/or shaped for attachment to the contour edge of the back panel 14. The front panel 37 is curved, flexible, and/or shaped for attachment to the contour edge of the carry handle 24, the floor panel 16, and in part the back panel 14. The front panel 37 is attached to the contour edge of the handle 24, and to the contour edge of the floor panel 16 shown in FIG. 3. The front panel 37 can also be attached to a portion of the lower and or top contour edge of the back panel 14 shown in FIG. 3. In this manner, each of the two side panels 35 is attached to the contour edge of the back panel 14 that is not already attached to the forward panel 37 (e.g., the side panels 35 and the front panel 37 can both be attach to the back panel 14).

As shown in FIG. 5, the forward panel 37 and the side panels 35 are also reversibly attached to each other. Reversible attachment of the forward panel 37 to one or both of the side panels 35 can be made by any means known in the art, including for example by a zipper 39. Reversible attachment can also be made using for example buttons, snaps, clips, or by hook and loop surfaces (e.g., Velcro). The presence of a zipper 39 or other means for reversible attachment between the front panel 37 and one or both of the side panels 35 allows for easy access into and out of the enclosure of the animal carrier.

The spine 34 is hidden from view in FIG. 5. In an embodiment the spine 34 can be passed through an open ended path formed in the material of the front panel 37. In other embodiments, the spine 34 can be sewn into or otherwise integrated into or onto the material of the front panel 37. In this way the spine 34 can be irreversibly attached or mounted to the front panel 37. Furthermore, the spine 34 can be made to fold about one or more hinge points to facilitate disassembly and storage of the animal carrier. In any of the aforementioned embodiments, the spine can still be attached to the apex 26 of the back panel 14 and to the forward edge 36 of the floor panel.

In general those pieces or components forming the frame of the animal carrier, including the back panel 14, floor panel 16, carry handle 24, and optionally the spine 34 are made from strong rigid materials that are interiorly lined with energy absorbing materials. Any side and/or front panels are generally made from flexible energy absorbing materials, such as fabric, foam, or any combination thereof.

Generally, to facilitate placement of an animal into the animal carrier, either the front panel or one or both of the side panels, or some combination thereof, can be made to be detachable, or otherwise reversibly attached in part, to each other or to one or more of the back panel, floor panel, or spine. For example, the side panels can be irreversible attached to the front panel by zipper, and irreversibly attached to the back panel. Optionally, the front panel or one or both of the side panels can be made to swivel or fold open about one or more hinges or fold lines. For example, one or both side panels 35 can be zippered, snapped, attached with Velcro, buttoned, or otherwise reversibly attached to a front panel 37 to facilitate placing an animal into the animal carrier. Moreover, once an animal is placed in the animal carrier and the enclosure of the animal carrier is closed (e.g.—side panel 35 is zippered or otherwise secured to front panel 37), any number of zippered, snapped, attached with Velcro, buttoned, or otherwise reversibly securable access doors can be added to either the front and/or one or more side panels to gain access to the animal.

The animal carrier can be disassembled for storage. The animal carrier can be collapsible in whole or in part, and individual components, segments, or panels can be detachable, or otherwise foldable about one or more pivot, fold, or hinge points. For example, the back panel 14 can be pivotally attached to the floor panel 16 by one or more hinges 22 (FIGS. 6a and 6d). The carry handle 24 can also be pivotally attached to the apex 26 of the back panel 14 by one or more hinges 23 (FIGS. 6a and 6c). The spine 34 can be completely detachable, or made to detach at one end and pivot at the other, or as described above the spine 34 can be irreversible integrated into a front panel and made to fold about one or more hinge points (FIGS. 6a and 6b).

To facilitate disassembly and folding of the animal carrier, thin polyethylene (PE) board can be sewn or otherwise incorporated into the fabric or other material of any of the side or front panels described herein, so as to create natural hinge or fold points to facilitate the inward folding of front and/or side panels during disassembly and storage of the animal carrier, as for example pursuant to FIGS. 6a-6e.

FIGS. 6a through 6e demonstrate one embodiment of a collapsible animal carrier frame. The spine 34 is first detached from the carry handle 24 and the floor panel 16. In FIG. 6b, the spine is shown a being completely detached, but as discussed above the spine 34 can also be incorporated irreversibly into the fabric or material of the front panel 37, and made to fold about one or more points. In either embodiment, once the spine 34 is detached, folded, or otherwise moved aside, the carry handle 24 can then be moved about the hinge 23 and folded onto the back panel 14. The floor panel 16 and the back panel 14 are then folded toward each other about hinge 22, resulting in a disassembled or collapsed animal carrier (FIGS. 6d and 6e). To permit folding into or against the collapsed back and floor panels, any of the side panels and/or front panels described herein, can be made of a flexible material, such as fabric, and can have hinge or fold points formed by the placement or incorporation of PE board.

Figure 7:
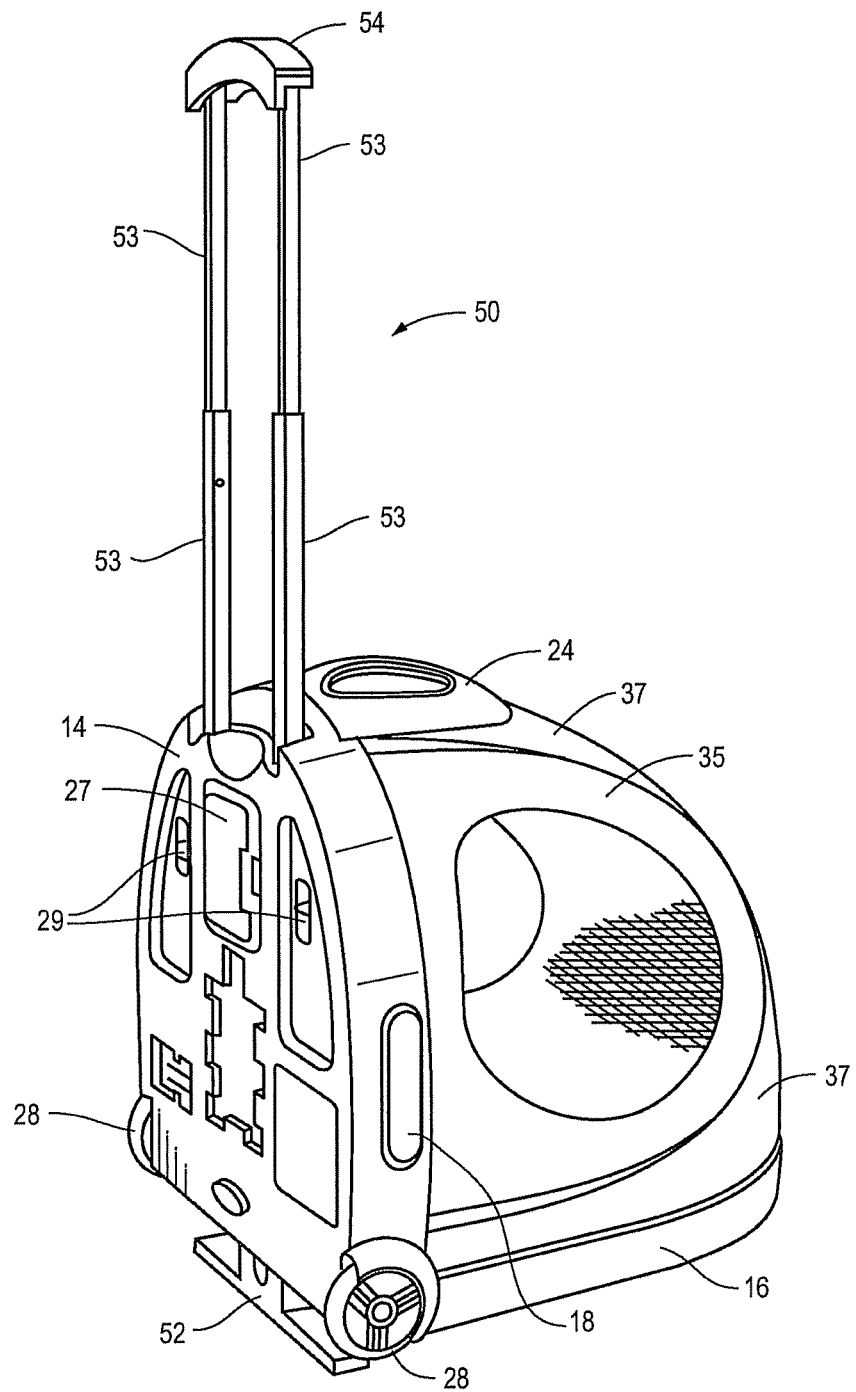
FIG. 7 is a perspective view of another embodiment having an extended telescoping handle assembly.

The animal carrier can also have a handle system for rolling transport, including for example a telescoping handle. FIG. 7 shows a back panel 14 having an integrated telescoping handle 50. The telescoping handle 50 assembly will typically include one or more telescoping posts 53 that extend from and collapse into the back panel 14 of the animal carrier. If two telescoping posts 53 are used, a cross-member or pull handle 54 is generally provided as a gripping surface. If a single telescoping post 53 is used, any number of gripping surfaces can be placed at the apex of the single post 53. For example, gripping surfaces can be used that include a member that rotates about the apex of the single telescoping post 53 to allow rotation of the gripping surface as the user maneuvers, such as for example a ball-and-socket type handle.

Figure 8:
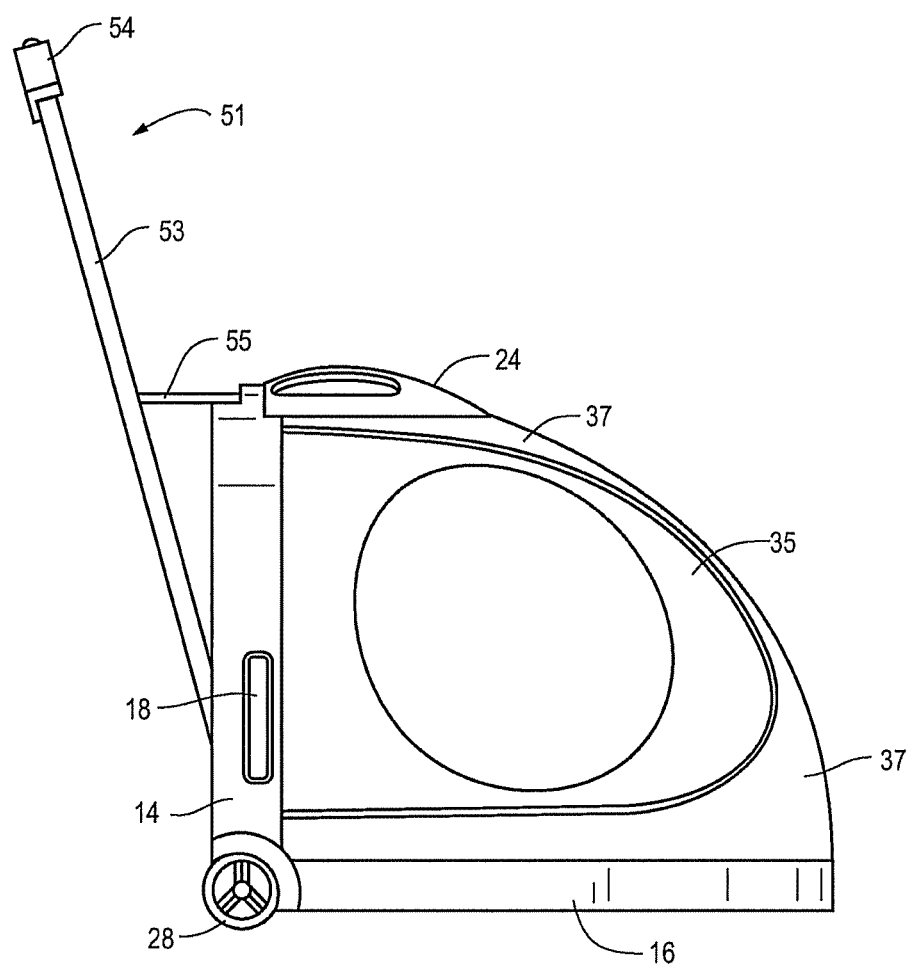
FIG. 8 is a side elevation view of another embodiment having a telescoping handle assembly.

In another embodiment, the telescoping handle can be attached to the outside of the back panel 14 and made to tilt. For example, FIG. 8 is a side elevation view of the animal carrier 12 showing an embodiment of a telescoping handle 51 that is attached to the outside of the back panel 14 and made to tilt when extended. A tilting telescoping handle will keep the animal carrier level during rolling transport. The tilting telescoping handle 51 includes supporting members 55 that are attached to one or more telescoping post 53 and the back panel 14. The supporting member 55 can be made to slide along the length of the telescoping post 53, as well as pivot about its point of attachment to the back panel 14, as it is extended or collapsed. The animal carrier can also have two back wheels 28 in combination with one or more front wheels at the forward position 36 of the floor panel 16 to mimic a stroller.

FIG. 7 also shows one embodiment of an animal carrier having a back panel 14 having an adjustable telescoping foot leveler 52. An adjustable telescoping foot can be used to adjust the animal carrier to a level position when placed or mounted on a surface that is not level, such as for example the surface of an automotive seat. An adjustable telescoping foot can also be useful in preventing excessive rebound forces that can be generated during an accident.

The animal carrier 10, 11, or 12 generally can hold or restrain or enclose an animal weighing up to about 7 Kgs, optionally up to about 9 Kgs, optionally up to about 11 Kgs, and optionally up to about 13 Kgs. The back panel 14 for example can have a height of at least 30 cm, optionally at least 45 cm, optionally at least 60 cm, optionally at least 80 cm, and optionally at least 90 cm. The back panel 14 for example can have a maximum height of between about 30 cm to about 90 cm. The back panel 14 can have for example a width of at least 30 cm, optionally at least 45 cm, optionally at least 60 cm, optionally at least 80 cm, and optionally at least 90 cm. The back panel can have for example a maximum width of between about 30 cm to about 90 cm. The floor panel 16 for example can have a length of at least 30 cm, optionally at least 45 cm, optionally at least 60 cm, optionally at least 80 cm, and optionally at least 90 cm. The floor panel 16 can have a maximum length of between about 30 cm to about 90 cm, and a maximum width of between about 30 cm to about 90 cm.

In order to accommodate larger animals or animals otherwise needing a larger space, the enclosure of the animal carrier can be enlarged for example by increasing the height and/or width of the back panel 14 to match a concomitant increase in the length and/or width of the floor panel 16. The dimensions of any side and/or front panel(s) can also be altered to together with the back and floor panels to increase the size of the enclosure to accommodate larger animals.

In order to accommodate larger animals or animals otherwise needing a larger space, the enclosure of the animal carrier can be enlarged by adjusting the shape and dimensions of the back panel 14 and/or the floor panel 16. For example, the width of the back panel 14 and the floor panel 16 can be increased. Other dimensions of the back panel 14 and/or the floor panel 16 can also be changed. For example, the height of the back panel 14 and/or the length of the floor panel 16 can also be increased.

As with prior embodiments, the enclosure of a enlarged animal carrier can be formed, for example, by attaching side and front panels that match the contour edges of a back panel 14 and a floor panel 16. The side and front panels of a larger animal carrier can be made of either flexible material such as a fabric, or solid rigid material such as molded plastic. If a flexible material is used for the front and side panels then multiple spines can be employed to provide support to the enclosure. If a rigid material is used for the side and front panels then the interior surfaces can be lined with an energy absorbing material such as foam.

Figure 9:
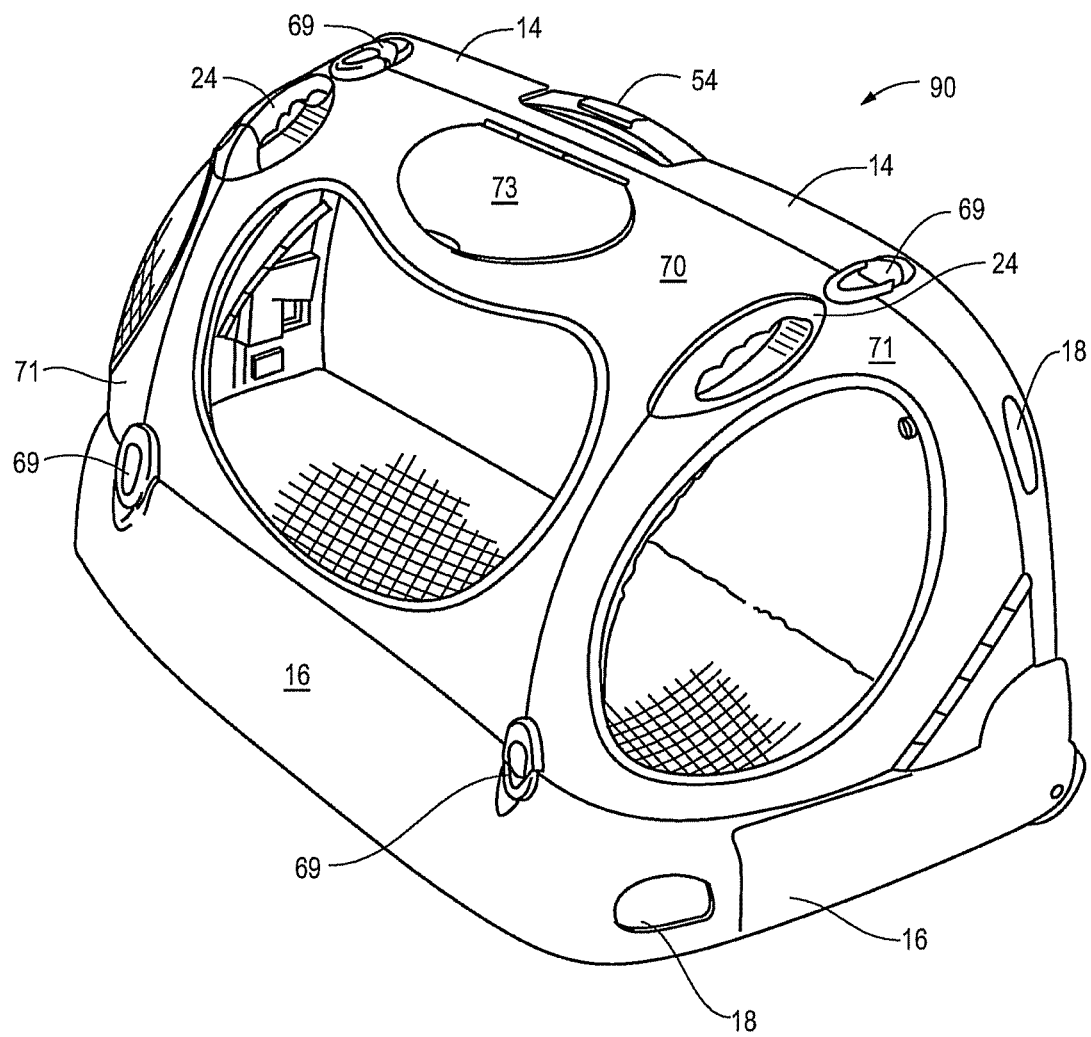
FIG. 9 is a perspective view of yet another embodiment having a larger enclosure.

FIG. 9 shows an embodiment of an animal carrier 90 designed to accommodate larger animals, for example those in excess of 9 Kgs, or animals otherwise needing a larger space. The animal carrier 90 has an elongated or wider back panel 14 (having a belt path 18) attached to a similarly elongated or wider floor panel 16 (also having an optional belt path 18). For example, the back panel 14 can be made larger and can have for example a height of up to 30 cm or more, and a width of 50 cm or more. The back panel 14 and the floor panel 16 can also be pivotally attached about at least one hinge point. The enclosure of the animal carrier 90 is formed by attachment of three rigid panels including an elongated front panel 70 and two side panels 71. The two side panels 71 can be mirror images of each other or different in some characteristic such as the placement of windows or the material from which it is manufactured. The rigid front panel 70 is attached to the top edge of the back panel 14 and to the forward edge of the floor panel 16, and can further include one or more spines for added support. The two side panels 71 are curved, and/or shaped for attachment to the contour side edges of the front panel 70, the back panel 14, and the floor panel 16. The front and side panels can be attached to each other and/or to the back and floor panels by latches or clips 69. The side and/or front panels can include transparent or ventilating materials to form windows or vents, such as for example meshed fabric or perforated plastics.

To place the animal into the animal carrier 90, either the front panel 70 or one or both of the side panels 71, or some combination thereof can be made detachable or otherwise made to swivel open about one or more hinges. Once the animal is inside, access door 73 can be used to gain access to the animal.

One or more carry handles 24 can also be attached to the animal carrier 90 at any position that will facilitate carrying transport. Wheels 28 can also be added to the animal carrier 90. For example, two wheels 28 can be attached to the bottom of the back panel 14 or to a hinge assembly connecting the back panel 14 and the floor panel 16. Optionally, one or more wheels can be attached to the forward facing edge of the floor panel 16.

Also shown in FIG. 9 is a cross-member 54 gripping surface of a telescoping handle assembly that is collapsed into the back panel 14 and therefore hidden from view (see telescoping handle 50 assembly of FIG. 7.)

The animal carrier 90 can also be attached to an automotive seat (e.g., bench seat) by passage of one or more installation belts (or standard automotive seat belts) through one or more belt paths, such as a belt path 18 built through the back panel 14 and optionally a belt path built through the floor panel 16

Any of the components or pieces of any animal carrier described herein, can be irreversibly or reversibly attached, connected, or joined to each other to produce the shape, form, or structure of the animal carrier. For example reversible attachment, connection, or joining can be by zipper, snap, clip, Velcro, or any other means for reversible attachment known in the art. Irreversible attachment can be by gluing, sewing, stapling, bolting, screwing, welding, soldering, or by any other irreversible attachment means known in the art.

Any of the components or pieces of any animal carrier described herein can be joined, connected, attached, or otherwise arranged relative to one another in either a non-movable/fixed or a movable/adjustable position. For example any of the components or pieces of the animal carrier can rotate or otherwise move relative to each other about one or more axis. Moreover, any of the components or pieces of the animal carrier can be pivotally connected, attached or arranged relative to one another, as for example about one or more hinge points.

It is contemplated that particular embodiments of the animal carrier described herein are structurally robust, and can withstand extreme crash impact energy. For example, those components forming the frame of the animal carrier, including but not limited to the back panel 14, the floor panel 16, the carry handle 24, and optionally the spine 34, can be made of a rigid material strong enough to withstand the impact energy of an automotive crash. Exemplar rigid materials include by are not limited to polypropylene, polycarbonate, polystyrene, polyethylene, acetal, nylon, carbon fiber, fiberglass, die cast aluminum, die cast zinc, steel tubing, aluminum tubing, magnesium tubing, or some combination or derivative thereof. Moreover, the side and front panels can be made from these same rigid materials, or the side and front panels can be made from more flexible materials including for example strong fabrics such as woven nylon fabric, woven polyester fabric, woven polyethylene fabric, woven polypropylene fabric, nylon, aromatic nylon (e.g., Nomex®), poly paraphenylene terephthalamide (e.g., Kevlar®), ultra high molecular weight polyethylene (e.g., Spectra® or Dyneema®), aromatic polyester (e.g., Vectran®), or any combination or derivative thereof. In addition, the interior of the animal carrier enclosure can be well-padded to provide a ride-down effect, or a dissipation of kinetic energy generated during impact. The interior surfaces of the animal carrier enclosure can also be padded with energy absorbing foams.

It is contemplated that particular embodiments of the animal carrier made using the above mentioned combination of materials can safely hold or contain an animal weighing up to about 9 Kgs or more in at least a 30 mile per hour forward facing or side facing impact. It is contemplated that particular embodiments of the animal carrier described herein can safely hold or contain an animal weighing up to about 9 Kgs or more against the deceleration forces generated throughout the time span of an accident sequence involving one or more impacts at speeds up to about 30 miles per hour. It is further contemplated that particular embodiments of the animal carrier can safely hold or contain an animal weighing up to about 9 Kgs or more in a forward facing or side facing impact generating g-forces of up to 22.5 or more.

Particular embodiments of the animal carrier described herein utilize the principle of energy absorption. Any of the interior facing surfaces of the enclosure, including any surfaces that contact or that can potentially contact an enclosed animal during an accident, can be covered or surfaced with one or more energy absorbing materials. For example, the interior facing surface of the back panel 14, the interior facing surface of the floor panel 16, the interior facing surface of the spine 34, the interior facing surface of the carry handle 24, and the interior facing surface of any rigid side or forward panels, or any other surface forming the enclosure or having potential contact with an enclosed animal, can be covered or surfaced with or formed from an energy absorbing material.

Exemplar energy absorbing material include but are not limited to slow recovery polyurethane slab foam, expanded polypropylene (EPP), expanded polystyrene (EPS), polyurethane foam (all types), woven nylon fabric, woven polyester fabric, engineered honeycomb foams, mesh and/or webbing consisting of twisted, braided or woven polyester, polyethylene, polypropylene, nylon, aromatic nylon (e.g., Nomex®), poly paraphenylene terephthalamide (e.g., Kevlar®), ultra high molecular weight polyethylene (e.g., Spectra® or Dyneema®), aromatic polyester (e.g., Vectran®).

The animal carrier can be reversibly attached or secured to an automotive seat. The animal carrier can be secured to an automotive seat by passing a standard automotive seat belt through the belt path 18 of the back panel 14. The animal carrier can also be secured to an automotive seat by passing a quick connect or installation belt through the belt path 18 of the back panel 14. A quick connect or installation belt generally has a belt first end having a fastener, a belt second end having a fastener, and an intermediate region between the ends. The quick connect or installation belt can further have a belt length adjuster 100 engaged to the intermediate region. The fasteners can be any design which enables attachment to the anchor points of an automotive LATCH anchor system.

LATCH stands for Lower Anchors and Tethers for Children. Newer vehicles have lower anchors for child restraints, each consisting of two rigid bars 6 mm in diameter and 25-50 mm long, that are present in the vehicle seat bight (the crack between the seat back and seat cushion) in specified seating positions in all cars, minivans, and pick-up trucks made after Sep. 1, 2002 (model year 2003), and in many made before that date, as mandated under FMVSSS213 (Federal Motor Vehicle Safety Standard) regulation.

Figure 10A:
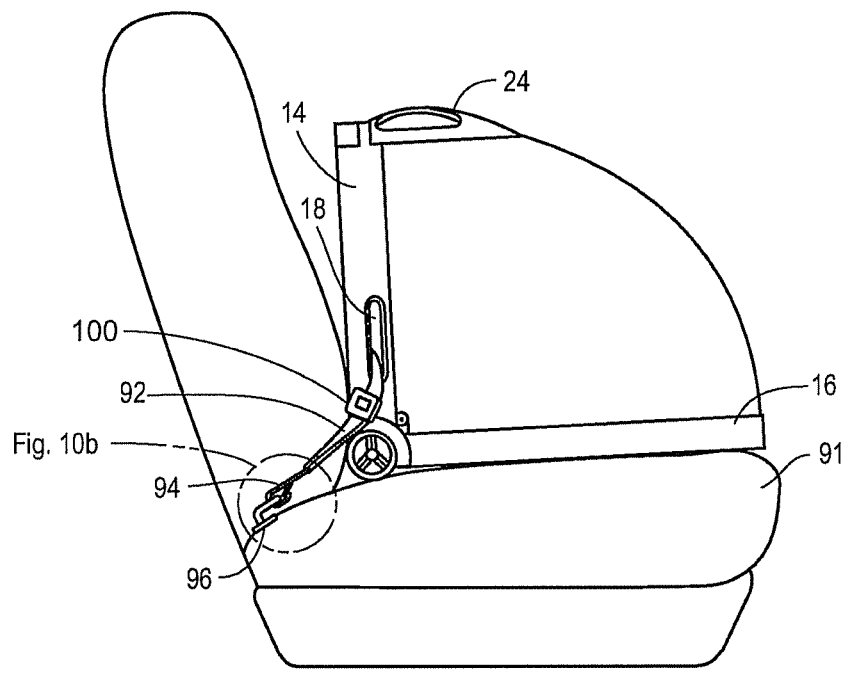
FIG. 10a is a diagrammatic side elevation view of the embodiment of FIG. 3 attached to a LATCH system anchor.
Figure 10B:
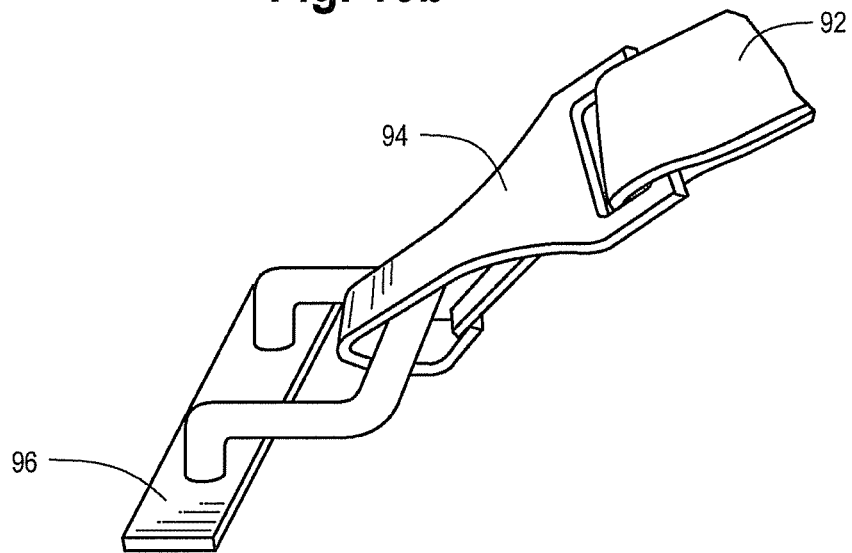
FIG. 10b is a perspective detail view of FIG. 10a showing a fastener attached or secured to a LATCH system anchor.

In one embodiment the animal carrier can have a belt path 18 through which is passed an installation belt having at both ends a fastener that attaches to a vehicles LATCH system anchors. For example, FIG. 10*a* shows an animal carrier attached to an automotive seat 91 using an quick connect or installation belt 92 passed through a belt path 18 built into and through the back panel 14, wherein the installation belt 92 has a fastener 94 (at both ends) which is reversibly attachable to the LATCH system anchor 96. FIG. 10*b* shows one embodiment of the fastener 94 attached or secured to a LATCH system anchor 96.

In particular embodiments, the installation belt 92 can be stored on or with the animal carrier when not in use. For example, as shown in FIG. 7 a storage compartment 27 can be added to the back panel 14. Optionally, two storage anchors 29 can be added, and when not in use the installation belt 92 can remain threaded through the belt path 18 and the clips 94 can be secured or attached to the storage anchors 29.

A vehicle or automotive seat base can also be mounted on an automotive or vehicle seat and the animal carrier can be reversibly attached to the base. The base can be either a horizontal base or a vertical base, and can be secured or mounted to the seat by passage of an automotive seat belt (e.g.—lap, lap and shoulder, or some combination), or an installation belt 92, through a belt path built into and through the base.

Attachment of the animal carrier to the base mounted on a vehicle seat is generally by way of an interlocking rail and channel system. In general, the animal carrier is engageable with compatibly configured frame members on the base. In the case of attachment to a vertical base, the height of the animal carrier can also be raised, for example to window level. If attachment of the animal carrier is to a vertical base and the animal carrier is raised, there can also be attached to the forward edge of the floor panel an adjustable foot leveler, which is similar to the foot leveler 52 shown in FIG. 7, except that instead of telescoping it would pivot about a 90 degree angle relative to the floor panel during use and storage. The animal carrier can also be mountable on a stroller or carriage.

Although it is automotive transport or the like with which the animal carriers described herein are primarily concerned, the concept is applicable to light aircraft as well as to large commercial aircraft and to multi-passenger vehicles such as busses and trains.

The invention claimed is:

1. An animal carrier having a frame assembly comprising:
   a vertical back panel having a top and bottom;
   a horizontal floor panel having a rear facing edge and a forward facing edge;
   at least two wheels attached to the bottom of the vertical back panel or rear facing edge of the horizontal floor panel;
   a carry handle attached to the top of the vertical back panel, said carry handle accessible when said animal carrier is assembled and in use; and
   a single support spine made of a rigid material;
   wherein the bottom of the back panel and the rear facing edge of the floor panel are attached, and the single support spine is attached to the top of the back panel and the forward facing edge of the floor panel.

2. The animal carrier of claim of claim 1, wherein the vertical back panel comprises a belt path.

3. The animal carrier of claim 1, wherein the back panel and the floor panel are attached by at least one hinge.

4. The animal carrier of claim 1, wherein the spine is reversibly attached to the back panel and the floor panel.

5. The animal carrier having a frame assembly of claim 1, having an enclosure comprising two side panels attached to said frame, wherein the side panels comprise energy absorbing material.

6. The animal carrier having a frame assembly of claim 1 having an enclosure comprising two side panels and one front panel attached to said frame, wherein the side panels and front panel comprise energy absorbing material.

* * * * *